United States Patent [19]

Hinz

[11] Patent Number: 5,662,392
[45] Date of Patent: Sep. 2, 1997

[54] ELECTROHYDRAULIC PRESSURE CONTROL DEVICE

[75] Inventor: Axel Hinz, Neu-Anspach, Germany

[73] Assignee: ITT Automotive Europe GmbH, Germany

[21] Appl. No.: 612,862

[22] PCT Filed: Sep. 2, 1994

[86] PCT No.: PCT/EP94/02925

§ 371 Date: Mar. 11, 1996

§ 102(e) Date: Mar. 11, 1996

[87] PCT Pub. No.: WO95/07201

PCT Pub. Date: Mar. 16, 1995

[30]   Foreign Application Priority Data

Sep. 11, 1993 [DE] Germany ............ 43 30 827.9

[51] Int. Cl.$^6$ ................................................. B60T 8/36
[52] U.S. Cl. ................................. 303/119.2; 303/113.1
[58] Field of Search ..................... 303/119.2, 119.1, 303/113.1; 335/202; 336/192; 137/884, 596.17, 596.16; 251/129.01, 129.15; 439/76, 672

[56]   References Cited

U.S. PATENT DOCUMENTS

| 3,403,884 | 10/1968 | Noakes et al. |
| 5,374,114 | 12/1994 | Burgdorf et al. ............... 303/119.2 |
| 5,520,447 | 5/1996 | Burgdorf et al. ............... 303/119.2 |

FOREIGN PATENT DOCUMENTS

| 0499670 | 8/1992 | European Pat. Off. . |
| 3138579 | 4/1983 | Germany . |
| 3534665 | 9/1985 | Germany . |
| 4001017 | 7/1991 | Germany . |
| 4037824 | 7/1991 | Germany . |
| 4121471 | 1/1992 | Germany . |
| 4039324 | 6/1992 | Germany . |
| 4100967 | 7/1992 | Germany . |
| 4104804 | 8/1992 | Germany . |
| 4108028 | 9/1992 | Germany . |
| 4112920 | 10/1992 | Germany . |
| 4118834 | 12/1992 | Germany . |
| 4124241 | 1/1993 | Germany . |
| 4135745 | 5/1993 | Germany . |
| 4137123 | 5/1993 | Germany . |
| 4141546 | 6/1993 | Germany . |
| 4313384 | 10/1993 | Germany . |
| 686658 | 1/1953 | United Kingdom . |
| 2156158 | 10/1985 | United Kingdom . |
| WO9208630 | 5/1992 | WIPO . |
| WO9212878 | 8/1992 | WIPO . |

OTHER PUBLICATIONS

Search Report of the German Patent Office for Application No. P4330827.9.

*Primary Examiner*—Douglas C. Butler
*Attorney, Agent, or Firm*—J. Gordon Lewis; Thomas N. Twomey

[57]   ABSTRACT

Stops are provided for positioning of the coils and an arrangement of the coils in the shaped part which is compact and functionally optimized and permits being manufactured and tested as easily as possible, while different heat expansions of the component parts and component tolerances shall be received with least possible tension, the present invention suggests the provision of stops on the bottom side of the shaped part close to the coils, which stops are supported on the coil casings by way of sleeves.

10 Claims, 3 Drawing Sheets

५,६६२,३९२

ELECTROHYDRAULIC PRESSURE CONTROL DEVICE

TECHNICAL FIELD

The present invention relates to an electrohydraulic pressure control device, in particular a braking pressure control devices for vehicles.

BACKGROUND OF THE INVENTION

An electrohydraulic pressure control device of the generic type is disclosed as an example in international publication No. WO 92/12878, wherein, in addition to the sufficiently known modular construction of the valve accommodating member, the lid is subdivided by a plate-shaped carrier element in order to accommodate an electronic controller or component parts of an electronic controller, and to provide the electrical connection between the electronic controller and the contact elements projecting from the solenoid valves. The lid, along with the coils of the solenoid valves, is slipped on the valve domes of the valve accommodating member, and plug contacts engage into each other for making the electrical connection between the contact elements and the electronic or electric components integrated in the lid. For the attachment of the coils to the carrier element, elastic mounts, for example, springs, are used, or the coils are embedded in an elastic shaped part. The elastic mounting means and shaped parts are complex in terms of their dimensioning and positioning on the coils.

Thus, an object of the present invention is to improve the pressure control device known from the previously mentioned state of the art such as to provide a simple positioning of the coils and a compact and functionally optimized assembly of the coils with respect to the carrier element, the assembly permitting to be manufactured and tested as easily as possible, while varying heat expansions of the component parts and component tolerances shall be absorbed with least possible tension.

It is proposed that the coils be arranged within a shaped part which includes stops pressing the sleeves, that are movable into abutment on the valve domes, on the coil casing which conducts the magnetic flux.

DETAILED DESCRIPTION OF THE PREFERRED EMBODIMENTS

Figure 1:
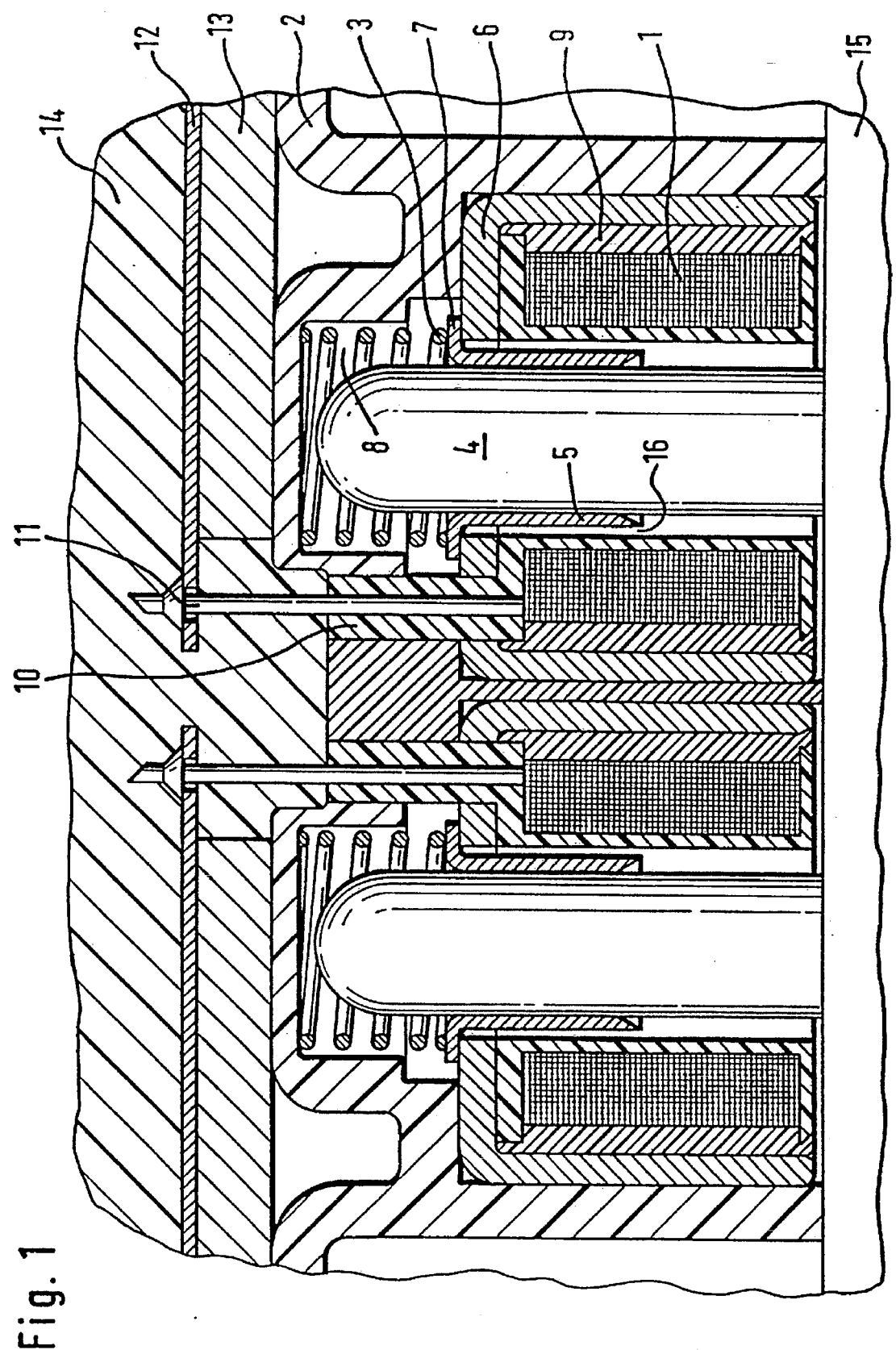
FIG. 1 is a partial cross-sectional view of a pressure control device including the features of the present invention.

FIG. 1 shows part of a cross-section of a first embodiment of the pressure control device of the present invention. The pressure control device includes a block-shaped valve accommodating member 15. A plurality of parallel arranged valve domes 4 which project from the top side of the valve accommodating member and receive coils 1 of the electromagnetic inlet and outlet valves of a slip-controlled brake system and coil casings 6 and sleeves 5 associated with the coils 1. The sleeves 5 function as yoke rings, for abutting the peripheral surface of each valve dome 4 and the coil casing 6. This is effected by way of compression springs, acting as stops 3, which are provided in cavities 8 of a shaped part 2 that is inserted over the solenoid valves and secured to the valve accommodating member 15. Also, the shaped part 2 accommodates the coils 1 at their coil casings 6 without clearance. Thus, component tolerances between the valve domes 4 and the sleeves 5 are compensated in each case by way of an annular slot 16 between the bowl-shaped coil casing 6 and the sleeve 5. Contacting of a bead 7 shaped on the sleeve 5 with the coil casing 6 is possible because a compression spring is placed in the cavity 8 above each valve dome 4. The compression spring permits a yielding support in the direction of the axis of the valve dome so that component tolerances between the coils 1 and the shaped part 2 in the direction of the valve dome axis can also be compensated. An insulating material 9 of the coils 1 forms a rigid connection with the coil casing 6 which is made of steel like the respectively associated sleeve 5. Contact elements 11 associated with the coils 1 extend on an extension 10 out of the insulating material 9. The contact elements 11 are connected with conducting paths 12 preferably by soldering points. Preferably, the conducting paths 12 are arranged on a printed circuit board supported on a plate-shaped carrier element 13. Favorably, the carrier element is made of light metal and enclosed by a sealing compound, acting as a cover unit 14, until the shaped part 2. The shaped part 2 is a plastic injection moulded part and accommodates on its top side the carrier element 13. An aperture in the carrier element 13 permits the unimpeded connection of the contact elements 11 to the conducting paths 12. The aperture is also filled with the sealing compound.

Figure 2:
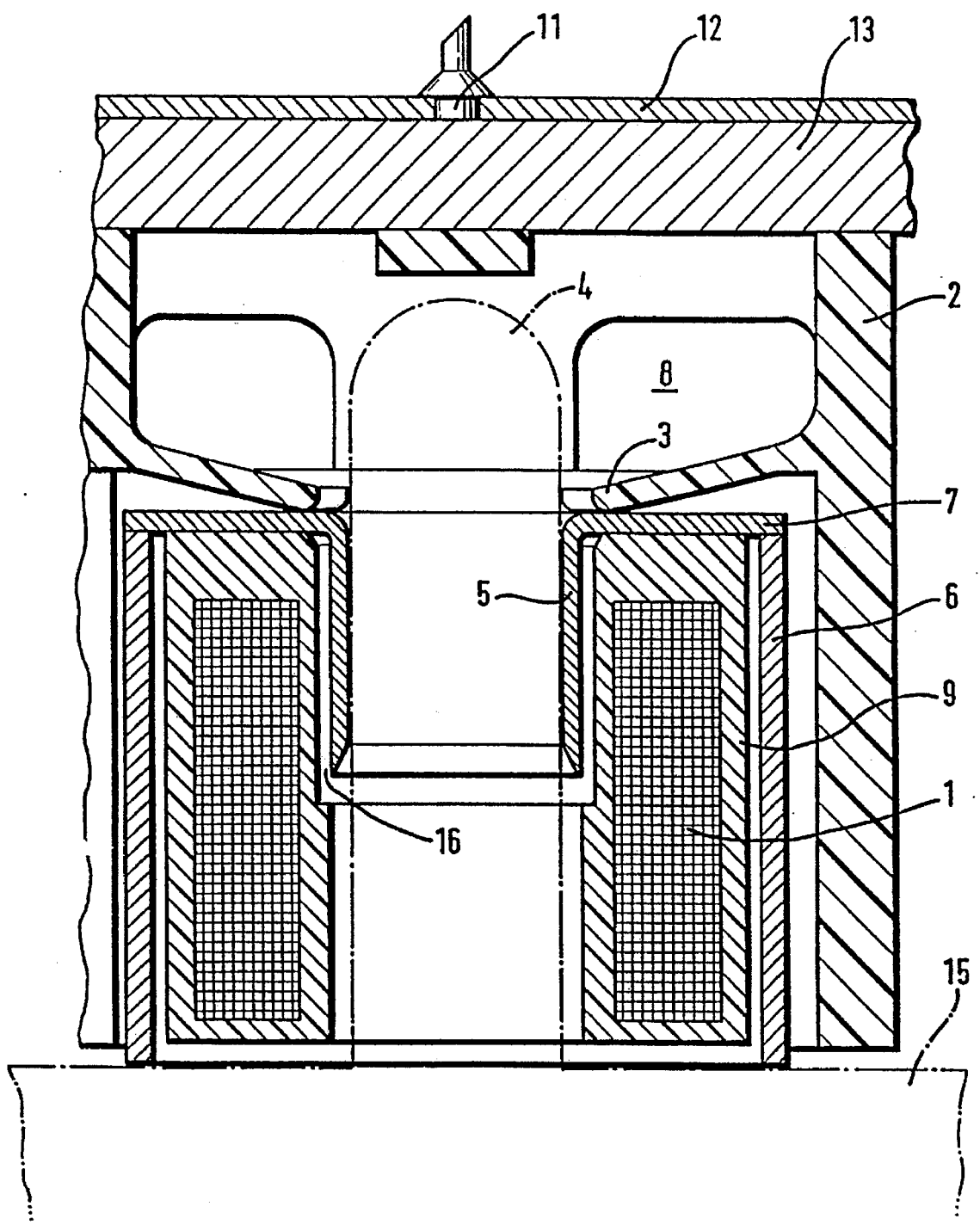
FIG. 2 is an alterative embodiment of the stops, the sleeves and the coil casing for a pressure control device.

In contrast to FIG. 1, FIG. 2 shows a special embodiment of the stops 3 with a modified contacting of the sleeves 5 with the coil casing 6. The stops 3 are provided as resilient tabs which, as a homogeneous component of the shaped part 2, are symmetrically distributed and extend into the cavity 8 and abut on the bead 7 of sleeve 5. The bead 7 extends until over the external diameter of the coil 1 so that the coil extends over the tubular coil casing 6 and contacts it. To make a sufficient amount of contact force act between the sleeve 5 and the coil casing 6, and to compensate vertical component tolerances, the height of the coil casing 6 is chosen to slightly exceed the height of the coil 1 so that, on seating the coil casing 6 on the valve accommodating member 15, these parts are moved along with the sleeve 5 against the resilient tab. Both the coil casing 6 and the sleeve 5 have a radial clearance with respect to the coil 1 to compensate component tolerances, thereby permitting an arrangement of these parts on the valve dome 4 without tension. The basic arrangement and design of the shaped part 2 along with the carrier element 13 and the conducting paths 12 on the valve accommodating member 15 corresponds to the depiction in FIG. 1. Thus, the embodiment show in FIG. 2 relates exclusively to differences with respect to the embodiment of the present invention.

Figure 3:
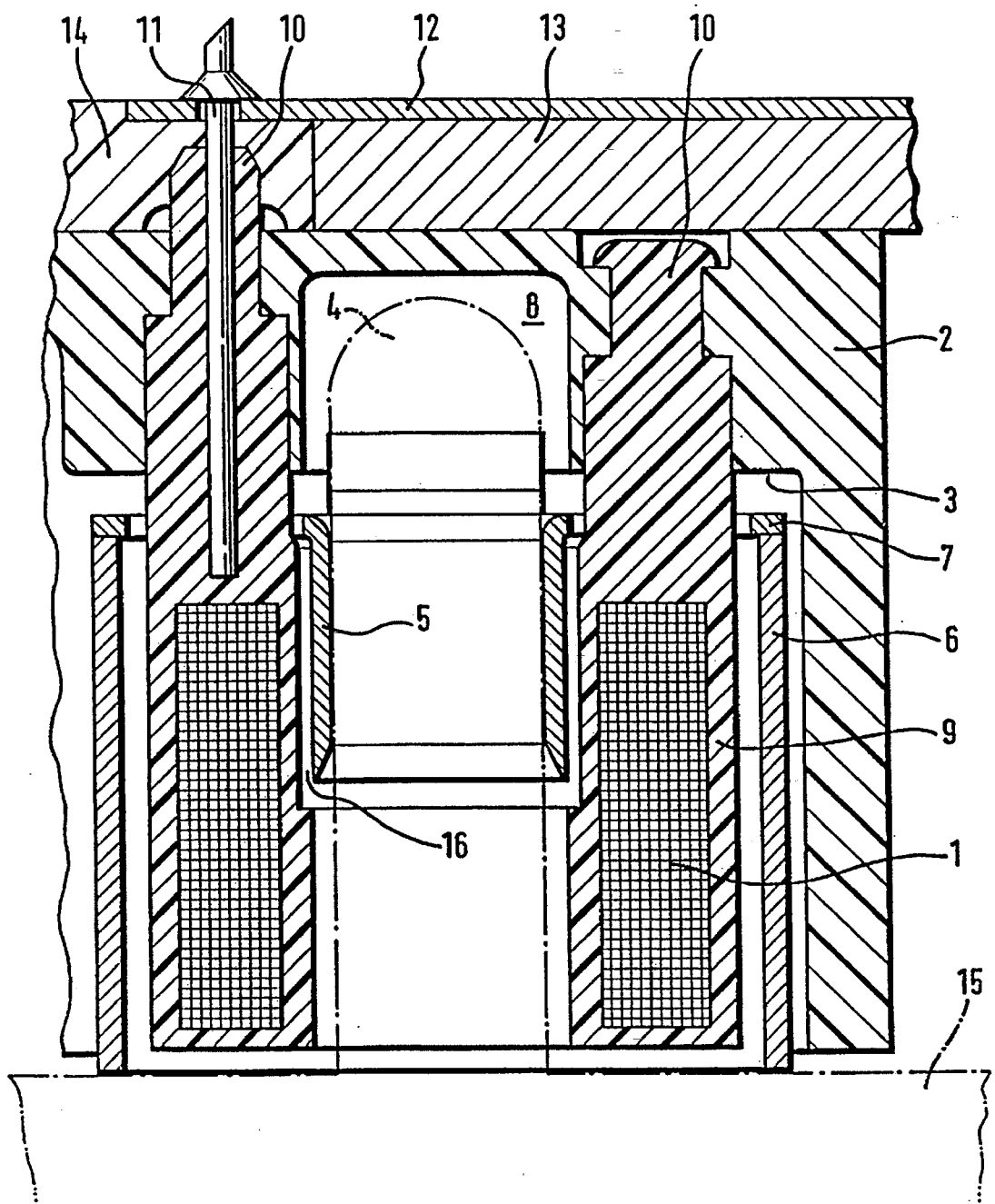
FIG. 3 is a view of a special fixing means and the abutment surfaces for the coils in the shaped part.

FIG. 3 shows another alternative embodiment of the idea of the present invention, described as an example by way of a valve assembly for a pressure control device. In contrast to the constructions described in the embodiments of FIGS. 1 and 2, the extension 10 serves as a fixing means of the coil 1 in the shaped part 2, on the one hand. On the other hand, the continuing extension 10, which accommodates the contact element 11, extends until the area of the carrier element 13 and the sealing compound, which encloses the conducting paths 12 and is suitable for the function of the cover unit 14. The sleeve 5 has openings in the bead 7 of a corresponding size allowing the passage of the two extensions 10 with a clearance. The contacting of the sleeve 5 and the coil casing 6 takes place equally, as explained in FIG. 2.

However, in contrast to this arrangement, the end surface defining the cavity 8 of the shaped part 2 acts as stop 3.

Concluding, the present invention requires only simple fixing means for aligning the coils. Complicated and costly (large-volume) spray-coating or injection moulding of the coil 1 to manufacture an elastic shaped part is not required. Problems with respect to cleaning and releasing the parts from the mold are avoided. The sleeve 5 and the coil casing 6 are an easy-to-make assembly. Easy-to-make sleeves 5 and coil casings 6 made of extrusion material can be used without the need to keep close manufacturing tolerances. The coils 1 can be arranged on the valve domes 4 regardless of component tolerances and the magnetic circuit can be closed in a surprisingly simple way. The horizontal and vertical distance of the coils 1 from the valve domes 4 can be sized generously. This facilitates greatly the effort of mounting the electrical assembly unit on the valve accommodating member 15.

I claim:

1. Electrohydraulic pressure control device, including electromagnetically operable hydraulic valves which are mounted on a valve accommodating member, coils having electric contact elements on their parts which project from the valve accommodating member, a coil casing conducting the magnetic flux, a cover unit which covers the projecting coil parts and the contact elements, a carrier element for connecting to the coils that is arranged inside the cover unit, the cover unit or part of the cover unit being adapted to accommodate an electronic controller, comprising:

a shaped part attached to the coils wherein the shaped part includes stop means, wherein each stop means contacts a sleeve which is movable into abutment on a valve dome, each sleeve conducting the magnetic flux abutting on a coil casing which conducts the magnetic flux.

2. Electrohydraulic pressure control device as claimed in claim 1, wherein the sleeve and the coil casing are movable in relation to each other.

3. Electrohydraulic pressure control device as claimed in claim 1, wherein the coil is spaced radially from the sleeve by an annular slot.

4. Electrohydraulic pressure control device as claimed in claim 1, wherein the sleeve has a bead which is movable into abutment on the end surface of the coil casing.

5. Electrohydraulic pressure control device as claimed in claim 1, wherein said stop means is a spring element which is guided in a cavity of the shaped part in which the valve dome is accommodated.

6. Electrohydraulic pressure control device as claimed in claim 1, wherein the stop means includes at least one resilient tab extending into the cavity, the resilient tab forming a homogeneous component part of the shaped part.

7. Electrohydraulic pressure control device as claimed in claim 1, wherein the stop means includes a step of an end surface of the shaped part defining the cavity, the sleeve with the coil casing being movable into abutment on this end surface.

8. Electrohydraulic pressure control device as claimed in claim 1, wherein the coil is enclosed by the insulating material having at least one extension that is captivated in the shaped part.

9. Electrohydraulic pressure control device as claimed in claim 8, wherein the extension accommodates at least one contact element of the coil which his connected to a conducting path that is positioned on the shaped part and retained on the carrier element.

10. Electrohydraulic pressure control device as claim in claim 1, wherein the carrier element is enclosed by a sealing compound.

* * * * *